(12) United States Patent
Diensthuber et al.

(10) Patent No.: US 6,619,352 B2
(45) Date of Patent: *Sep. 16, 2003

(54) TREAD PROFILE OF A SNOW TIRE

(75) Inventors: Franz Diensthuber, Hannover (DE); Wolfgang Peschel, Garbsen (DE)

(73) Assignee: Continental Aktiengesellschaft, Hannover (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/204,291

(22) Filed: Dec. 3, 1998

(65) Prior Publication Data

US 2001/0035244 A1 Nov. 1, 2001

(Under 37 CFR 1.47)

(30) Foreign Application Priority Data

Dec. 4, 1997 (DE) .......................................... 197 53 819

(51) Int. Cl.[7] .......................... B60C 11/11; B60C 11/12; B60C 111/00
(52) U.S. Cl. ................................. 152/209.2; 152/209.8; 152/209.9; 152/209.18; 152/209.22; 152/209.23; 152/DIG. 3
(58) Field of Search ........................... 152/209.2, 209.8, 152/209.9, 209.18, 209.22, 209.23, 209.25, 209.28, DIG. 3, 902

(56) References Cited

U.S. PATENT DOCUMENTS 4,546,808 A * 10/1985 Fontaine et al. .......... 152/209.9
4,702,292 A * 10/1987 Brayer ........................ 152/902

(List continued on next page.)

FOREIGN PATENT DOCUMENTS

DE 1886124 1/1964
DE 1505097 2/1969

(List continued on next page.)

OTHER PUBLICATIONS

Machine Translation for Japan 5–178014.*
Translation for Europe 696521.*

(List continued on next page.)

*Primary Examiner*—Steven D. Maki
(74) *Attorney, Agent, or Firm*—Greenblum & Bernstein, P.L.C.

(57) ABSTRACT

Tread profile of a snow tire for a vehicle in which at least two vehicle wheels are rotatably mountable outside of a longitudinal vehicle axis. The tread profile includes a plurality of profile block rows aligned in a circumferential direction and distributed in an axial direction from a first tire shoulder adapted to be positioned toward an outside of the vehicle in an operational state of the tire on the vehicle to a second tire shoulder adapted to be positioned toward an inside of the vehicle in an operational state of the tire on the vehicle. The tread profile also includes a plurality of channels aligned in a circumferential direction and being arranged to axially separate the plurality of profile block rows from each other, and the plurality of channels includes a first circumferential channel positioned to divide the tread profile into two axial regions of functionally different structure, and each axial region axially extending from one the first and second tire shoulders to the first circumferential channel. The plurality of profile block rows includes a plurality of profile block elements, and the plurality of profile block elements in the axial region extending from the circumferential channel to the first tire shoulder have a higher lateral thrust stiffness than the plurality of profile block elements in the axial region extending from the first circumferential channel to the second tire shoulder.

22 Claims, 3 Drawing Sheets

U.S. PATENT DOCUMENTS

| | | | | | |
|---|---|---|---|---|---|
| 4,815,511 | A | * | 3/1989 | Brayer et al. | 152/902 |
| 4,913,208 | A | * | 4/1990 | Anderson et al. | 152/209.22 |
| 4,934,424 | A | * | 6/1990 | Kojima | 152/209.25 |
| 5,213,641 | A | * | 5/1993 | Tsuda et al. | 152/209.9 |
| 5,350,001 | A | * | 9/1994 | Beckmann et al. | 152/DIG. 3 |
| 5,360,043 | A | * | 11/1994 | Croyle et al. | 152/209.28 |
| 5,660,651 | A | * | 8/1997 | Diensthuber | 152/209.8 |
| 6,026,875 | A | * | 2/2000 | Diensthuber et al. | 152/209.28 |
| 6,105,644 | A | * | 8/2000 | Ikeda | 152/209.8 |

FOREIGN PATENT DOCUMENTS

| | | | | |
|---|---|---|---|---|
| DE | 3130574 | | 2/1983 | |
| DE | 3324649 | | 3/1985 | |
| DE | 3815829 | * | 12/1988 | 152/209.8 |
| DE | 4446311 | | 6/1995 | |
| DE | 19705156 | | 10/1997 | |
| EP | 564435 | * | 10/1993 | 152/209.21 |
| EP | 696521 | * | 2/1996 | 152/DIG. 3 |
| EP | 846579 | * | 6/1998 | |
| FR | 791250 | * | 12/1935 | 152/DIG. 3 |
| JP | 5-178014 | * | 7/1993 | |
| JP | 6-106916 | * | 4/1994 | 152/209.28 |
| JP | 6-143941 | * | 5/1994 | 152/209.23 |

OTHER PUBLICATIONS

Translation for German 3815829.*

Machine Translation for Japan 6–106916.*

* cited by examiner

TREAD PROFILE OF A SNOW TIRE

CROSS-REFERENCE TO RELATED APPLICATIONS

The present application claims priority under 35 U.S.C. §119 of German Patent Application No. 197 53 819.3, filed on Dec. 4, 1997, the disclosure of which is expressly incorporated by reference herein in its entirety.

BACKGROUND OF THE INVENTION

1. Field of the Invention

The present invention relates to a tread profile of a snow tire.

2. Discussion of Background Information

Various and conflicting demands are placed on snow tires. That is, a snow tire is supposed to ensure good traction on snow and ice and good handling characteristics, e.g., as in summer tires. However, these demands require conflicting measures in the design of the snow tire, i.e., to provide either a snow tire with either good winter characteristics, e.g., good traction on ice and snow and comparatively poor handling on dry roads, or a summer tire with good handling on dry roads, but comparatively poor winter characteristics.

SUMMARY OF THE INVENTION

The present invention provides a tread profile for a snow tire with both good winter characteristics, e.g., good traction on ice and snow, and good handling on dry roads.

The present invention contemplates a tread profile that includes a plurality of profile block rows aligned in a circumferential direction and spaced in an axial direction from a first tire shoulder, adapted to be positioned toward an outside of the vehicle in an operating state of the tire, to a second tire shoulder, adapted to be positioned toward an inside of the vehicle in an operating state of the tire, and a plurality of channels aligned in the circumferential direction and arranged to axially separate the plurality of profile block rows from each other. The plurality of channels includes a first circumferential channel positioned to divide the tread profile into two axial regions of functionally different structure. Each axial region axially extends from an associated tire shoulder to the first circumferential channel. The profile block elements in the axial region extending from the first circumferential channel to a first tire shoulder directed away from the vehicle during an operating state of the tire are constructed with a higher lateral thrust stiffness than the profile block elements in the axial region extending from the first circumferential channel to a second tire shoulder pointing toward the inside of the vehicle in the operating state of the tire on the vehicle.

As a result of the stiffer construction of the profile block elements on the side of the tread profile pointing toward the outside of the vehicle, the stiffness desired for handling may be substantially ensured on this side of the tire (i.e., the handling side), which is important for handling, and, therefore, good handling on dry roads is provided. In the axial tread region that is less important for handling (i.e., the winter side), the low stiffness of the profile blocks that is important for good traction on snow and ice are provided, and, therefore, good winter traction is substantially ensured.

In the exemplary embodiment of the present invention, it may be preferable to arrange the profile blocks such that the profile blocks in the axial region directed toward the inside of the vehicle have structural factors, both along a circumferential direction and perpendicular to circumferential direction, between approximately 10 and 50% higher than the structural factors of the profile blocks in the axial region directed toward the outside of the vehicle. Thus, an especially high number of traction edges may be created on the winter side. Further, a large number of sipes, which are substantially responsible for the structural factor, may make the profile blocks even softer on the winter side. Conversely, the handling side may be stiffer due to the lower number of the sipes creating the traction edges. The structural factor in the circumferential direction is a sum of the profile block edges and sipes projecting in the circumferential direction, and the structural factor in the direction perpendicular to the circumferential direction is the sum of the profile block edges and sipes projecting perpendicular to the circumferential direction.

The exemplary embodiment may also preferably include a pitch count in the axial region directed toward the inside of the vehicle that may be greater than pitch count in the axial region directed toward the outside of the vehicle. As a result of this construction, more and smaller profile elements may be created on the winter side of the tire than on the handling side of the tire. Thus, even more profile edges may be provided for facilitating winter taction. As a result of this feature, the handling side may also be more stiffly constructed.

Free visibility through a circumferential groove is a measure of ice traction and snow traction. As a result, the tire of the present invention may be formed such that at least one additional circumferential channel or groove may be provided in both axial regions to separate two adjacent profile block rows from one another. It may be preferable to form the at least one additional circumferential channel in the axial region directed toward the vehicle to have an exposed groove cross-section that is smaller than the exposed groove cross-section of the at least one additional circumferential channel in the axial region directed toward the outside of the vehicle. It may be preferable still to provide the exposed groove cross-section of the at least one additional circumferential channel in the axial region directed toward the vehicle with a width that is at least half as large as the exposed groove cross-section of both the first circumferential channel and/or the at least one additional circumferential channel in the axial region directed toward the outside of the vehicle. In this manner, the tire of the present invention may exhibit further improvement over known tires in ice traction characteristics and in braking characteristics on snow without jeopardizing handling characteristics on dry roads.

The profile block elements on the winter side of the tire may include a plurality of sipes that extend through the profile block elements, and it may be preferable to arrange the sipes such that a distance between a peripheral edge of a respective profile block element and an adjacently arranged sipe arranged within the respective profile block element is between approximately 7 and 15% greater than a distance between the substantially parallelly arranged sipes arranged within the respective profile block element. Further, it may be preferable to provide a sipe depth at the edges of the profile block element that is between approximately 10 and 20% smaller than in a region between the edges of the profile block, i.e., in the interior of the profile block element. Thus, the profile block elements may be constructed with a hard, wear-reducing shell outside and a soft core inside that improves winter characteristics.

The exemplary embodiment of the present invention may preferably include at least one profile block row formed by successively arranged profile block elements in the circumferential direction that are separated by diagonally running channels forming transverse edges to define the profile block elements in the circumferential direction, that include longitudinal edges to laterally define the profile block elements, and that include spaced sipes that extend through the profile block element at an angle between approximately 80 and 110° to the longer diagonals of a trapezoid formed by the transverse edges and the longitudinal edges. This particular arrangement may make possible a particularly high effective edge length in the profile block elements. Further, the exemplary embodiment may preferably include, at the tire shoulders and in at least one profile block row arranged between the tire shoulders, profile block rows formed by successively arranged profile block elements in the circumferential direction that are separated by diagonally running channels forming transverse edges to define the profile block elements in the circumferential direction, that include longitudinal edges to laterally define the profile block elements, and that include spaced sipes that extend through the profile block element. The sipes within the tire shoulder profile block elements may be oriented substantially parallel to the diagonally running channel defining the profile block elements in the circumferential direction, and the sipes within the profile block elements of the profile block row between the tire shoulders may be oriented to extend through the profile block element at an angle between approximately 80 and 110° to main diagonals of a trapezoid formed by the transverse edges and the longitudinal edges. This particular arrangement may make possible a particularly highly effective edge length in the profile block elements of the winter side, and a smaller effective edge length, and, thereby, greater stiffness in the profile block elements of the handling side.

In accordance with the present invention, it may be preferable to further include an additional profile block row in the axial region directed toward the inside of the vehicle that may be separated from a profile block row of the second tire shoulder by a second circumferential channel (groove). These two adjacent profile block rows may be formed with successively arranged profile block elements in a circumferential direction that may be separated by diagonally running cross channels forming transverse edges to define the profile block elements in the circumferential direction, that include longitudinal edges to laterally define the profile block elements, and that may include spaced sipes that extend through the profile block element. The cross channels may extend over both profile block rows and axially inwardly from the second tire shoulder under constant inclination. The cross channels may be arranged to be offset from one another in the circumferential direction at a transition position through the second circumferential channel such that an end of the cross channel of the second tire shoulder block row pointing toward the second circumferential channel occupies a same circumferential position as an end of the cross channel of the adjacent profile block row directed toward the second circumferential channel. This particular arrangement may facilitate a reliable outflow of water through the profile channels and, thereby, substantially ensure good hydroplaning (aquaplaning) characteristics.

The tire of the present invention may also include at least one additional profile block row in the axial region directed toward the inside in the vehicle that may be separated from a profile block row of the second tire shoulder by a second circumferential channel (groove). The profile block elements of the second tire shoulder block row and of the additional profile block row(s) may each include a plurality of transverse sipes having sinusoidal progressions in the longitudinal direction of sipes and that are separated from one another. The progression of the sipes along a depth of the sipe may be formed to be continuously phase-shifted in the longitudinal direction. Thus, a phase shift occurs along the depth of the sipe, which is substantially constant in accordance with a line of inclination having an angle of inclination $\alpha$ to the radial direction, and adjacent sipes in a same profile block element may be formed to have a substantially opposite phase shift along the depth of the sipe, in accordance with a line of inclination having an angle of inclination $\beta$ to the radial direction. In this manner, the two lines of inclination, which are inclined in opposite directions, may subtend an angle $\gamma=\alpha+\beta$. Thus, angle $\gamma$ is a measure for the twist of the sipes of the profile block elements. Twist angle $\gamma$ in the profile block elements of the second tire shoulder block row may be greater than twist angle $\gamma$ of the additional profile block row(s). In particular, twist angle $\gamma$ in the second tire shoulder profile block elements may be between approximately 35 and 60° and twist angle $\gamma$ of the additional profile block row(s) may be between approximately 15 and 25°. Thus, this particular arrangement may make possible a greater stiffening of the profile block elements in the shoulders as compared to the profile block elements between the shoulders. The stiffening in the shoulders may additionally improve the handling characteristics with the good winter traction characteristics provided by the softer design of the center region of the tire. The stiffer design in the second tire shoulder may make possible the additional incorporation of further sipes in these profile elements, which, simply by providing additional edges, would further improve the winter traction. Moreover, the row of second tire shoulder blocks may be reduced in stiffness, thereby, further improving the winter traction.

The tire of the present invention may include two shoulder profile block rows and at least one additional profile block row positioned between the two shoulder profile block rows. One circumferential channel (groove) at a time may be formed between the profile block rows. The profile block elements of the at least one of the tire shoulder block rows and of the additional profile block row(s) may each include a plurality of transverse sipes having sinusoidal progressions in the longitudinal direction of sipes and that are separated from one another. The progression of the sipes along a depth of the sipe may be formed to be continuously phase-shifted in the longitudinal direction. Thus, a phase shift occurs along the depth of the sipe, which is substantially constant in accordance with a line of inclination having an angle of inclination $\alpha$ to the radial direction, and adjacent sipes in a same profile block element may be formed to have a substantially opposite phase shift along the depth of the sipe, in accordance with a line of inclination having an angle of inclination $\beta$ to the radial direction. In this manner, the two lines of inclination, which are inclined in opposite directions, may subtend an angle $\gamma=\alpha+\beta$. Thus, angle $\gamma$ is a measure for the twist of the sipes of the profile block elements. Twist angle $\gamma$ in the profile block elements of the at least one tire shoulder block row may be greater than twist angle $\gamma$ of the additional profile block row(s). In particular, twist angle $\gamma$ in the at least one tire shoulder profile block elements may be between approximately 35 and 60° and twist angle $\gamma$ of the additional profile block row(s) may be between approximately 15 and 25°. Thus, the higher twist in the shoulders has the effect that these profile elements are more stiffly constructed than the profile elements in the center region. The stiffening in the shoulders improves the handling characteristics, while the softer design of the center region substantially ensures good winter traction characteristics. Further, the stiffer design in the second tire shoulder makes possible the additional incorporation of further sipes in these profile elements so as to further improve winter traction simply by providing additional edges. Moreover, the row of second tire shoulder blocks may reduce stiffness, thereby, further improving winter traction.

Accordingly, the present invention is directed to a tread profile of a snow tire for a vehicle. The tread profile includes a plurality of profile block rows aligned in a circumferential direction and distributed in an axial direction from a first tire shoulder adapted to be positioned toward an outside of the vehicle in an operational state of the tire on the vehicle to a second tire shoulder adapted to be positioned toward an inside of the vehicle in an operational state of the tire on the vehicle. The tread profile also includes a plurality of channels aligned in a circumferential direction and being arranged to axially separate the plurality of profile block rows from each other, and the plurality of channels includes a first circumferential channel positioned to divide the tread profile into two axial regions of functionally different structure, and each axial region axially extending from one of the first and second tire shoulders to the first circumferential channel. The plurality of profile block rows includes a plurality of profile block elements, and the plurality of profile block elements in the axial region extending from the circumferential channel to the first tire shoulder have a higher lateral thrust stiffness than the plurality of profile block elements in the axial region extending from the first circumferential channel to the second tire shoulder.

In accordance with another feature of the present invention, a structure factor along the circumferential direction and along a direction perpendicular to the circumferential direction in the plurality of profile block elements in the axial region extending from the first circumferential channel to the second tire shoulder is between approximately 10 and 50% higher than a structure factor along the circumferential direction and along the direction perpendicular to the circumferential direction in the plurality of profile block elements in the axial region extending from the first circumferential channel to the first tire shoulder.

In accordance with another feature of the present invention, a pitch count in the axial region extending from the first circumferential channel to the second tire shoulder is greater than a pitch count in the axial region extending from the first circumferential channel to the first tire shoulder.

In accordance with still another feature of the present invention, at least one additional circumferential channel is positioned in the axial region extending from the first circumferential channel to the second tire shoulder and in the axial region extending from the first circumferential channel to the first tire shoulder to separate adjacent profile block rows from each other. An exposed groove cross-section of the at least one additional circumferential channel in the axial region extending from the first circumferential channel to the second tire shoulder is smaller than an exposed groove cross-section of the at least one additional circumferential channel in the axial region extending from the first circumferential channel to the first tire shoulder pointing toward the vehicle outside in the operating state of the tire on the vehicle, and the exposed groove cross-section of the at least one additional circumferential channel in the axial region extending from the first circumferential channel to the second tire shoulder is at least half as large as an exposed groove cross-section of the first circumferential channel and the exposed groove cross-section of the at least one additional circumferential channel in the axial region extending from the circumferential channel to the first tire shoulder.

In accordance with a further feature of the present invention, the plurality of profile block elements in the axial region extending from the first circumferential channel to the second tire shoulder includes a plurality of sipes that are substantially parallelly arranged and that extend over the plurality of profile block elements. A distance between a peripheral edge of a respective profile block element and an adjacently arranged sipe arranged within the respective profile block element is greater than a distance between the substantially parallelly arranged sipes arranged within the respective profile block element. Further, the distance between the peripheral edge of the respective profile block element and the adjacently arranged sipe arranged within the respective profile block element is between approximately 7 and 15% greater than the distance between the substantially parallelly arranged sipes arranged within the respective profile block element.

In accordance with a still further feature of the present invention, the plurality of profile block elements in the axial region extending from the first circumferential channel to the second tire shoulder include a plurality of sipes that are substantially parallelly arranged and extending over the plurality of profile block elements. A depth profile of the sipes of a respective profile block element extending through the respective profile block element may have a smaller depth at edges of the respective profile block element than at an interior of the respective profile block element. Further, the depth of the sipes at the edges of the respective profile block element may be between approximately 10 and 20% less than the depth of the sipe at the interior of the respective profile block element.

In accordance with another feature of the present invention, at least one of the plurality of profile block rows includes profile block elements successively arranged in the circumferential direction and separated cross channels oriented diagonally to the circumferential direction. The diagonally oriented cross channels form diagonally running transverse edges for the profile block elements in the circumferential direction. The profile block elements of the at least one profile block row include longitudinal edges that define the profile block elements in the axial direction. The profile block elements of the at least one profile block row include a plurality of sipes arranged to be spaced from each other and extending across the profile block element, and the sipes may be oriented to extend at an angle between approximately 80 and 110° to a longer diagonal edge of the profile block element.

In accordance with yet another feature of the present invention, the profile block rows located at the first and second tire shoulders and at least one profile block row located between the first and second tire shoulders include profile block elements successively arranged in the circumferential direction and separated cross channels oriented diagonally to the circumferential direction. The diagonally oriented cross channels form diagonally running transverse edges for the profile block elements in the circumferential direction. The profile block elements of the at least one profile block row may include longitudinal edges that define the profile block elements in the axial direction. The profile block elements of the at least one profile block row include a plurality of sipes arranged to be spaced from each other and to extend across the profile block element, such that the sipes arranged within the first and second tire shoulder profile block rows may be oriented substantially parallel to the cross channel forming the diagonally running transverse edges of the profile block elements of the shoulder profile block rows, and the sipes arranged within the at least one profile block row located between the first and second tire shoulders may be oriented to extend at an angle between approximately 80 and 110° to a longer diagonal edge of the profile block element.

In accordance with still another feature of the present invention, an additional profile block row may be located within the axial region extending from the circumferential channel to the second tire shoulder and adjacent to the profile block row that includes the second tire shoulder, and a second circumferential channel may be arranged to separate the additional profile block row from the second tire shoulder profile block row. The second tire shoulder profile block row and the additional profile block row may include profile block elements successively arranged in the circumferential direction and separated cross channels oriented diagonally to the circumferential direction. The diagonally oriented cross channels may form diagonally running transverse edges for the profile block elements in the circumferential direction, and the diagonally oriented cross channels may extend over both the second tire shoulder profile block row and the additional profile block rows and extend under substantially constant inclination axially inwardly from the second tire shoulder. The cross channels may be arranged to be offset from each other in the circumferential direction at a transition through the second circumferential channel such that an end of the cross channel of the second tire shoulder profile block row is oriented across the second circumferential channel at a same circumferential position as an end of the cross channel of the second tire shoulder block row.

In accordance with a further feature of the present invention, at least one additional profile block row may be located within the axial region extending from the circumferential channel to the second tire shoulder and adjacent to the profile block row that includes the second tire shoulder, and a second circumferential channel may be arranged to separate the additional profile block row from the second tire shoulder profile block row. The profile block elements of the second tire shoulder profile block row and of the at least one additional profile block row may include a plurality of substantially transverse and substantially sinusoidal sipes separated from each other that extend in a longitudinal direction. The substantially sinusoidal sipes may be arranged such that, along a depth in a radial direction, at least one substantially sinusoidal sipe is continuously phase-shifted in the longitudinal direction, the phase-shift occurring along a line of inclination oriented at an angle α, with respect to the radial direction, and at least one adjacent sipe positioned adjacent to the at least one substantially sinusoidal sipes is continuously phase-shifted in a direction opposite the longitudinal direction, the phase-shift occurring along a line of inclination oriented at an angle β, with respect to the radial direction. In this manner, the lines of inclination for adjacent substantially sinusoidal sipes are arranged to form a twist angle γ=α+β, which is a measure for twist of the substantially sinusoidal sipes. Further, the twist angle γ of the second tire shoulder profile block elements may be greater than the twist angle γ of the at least one additional profile block elements. Further, the twist angle γ of the second tire shoulder profile block elements may be between approximately 35 and 60° and the twist angle γ of the at least one additional profile block elements is between approximately 15 and 25°.

In accordance with yet another feature of the present invention, the vehicle includes at least two vehicle wheels that are rotatably mountable outside of a longitudinal vehicle axis.

The present invention may also be directed to a tread profile of tire that includes profile block rows including two shoulder profile block rows and at least one additional profile block row arranged between the two shoulder profile block rows, and one circumferential channel positioned between the profile block rows. The profile block rows include profile block elements, and the profile block elements of at least one of the two shoulder block rows and of the at least one additional profile block row include a plurality of substantially transverse and substantially sinusoidal sipes separated from each other that extend in a longitudinal direction. The substantially sinusoidal sipes may be arranged such that, along a depth in a radial direction, at least one substantially sinusoidal sipe is continuously phase-shifted in the longitudinal direction, the phase-shift occurring along a line of inclination oriented at an angle α, with respect to the radial direction, and at least one adjacent sipe positioned adjacent to the at least one substantially sinusoidal sipes is continuously phase-shifted in a direction opposite the longitudinal direction, the phase-shift occurring along a line of inclination oriented at an angle β, with respect to the radial direction. In this manner, the lines of inclination for adjacent substantially sinusoidal sipes may be arranged to form a twist angle γ=α+β, which is a measure for twist of the substantially sinusoidal sipes, and the twist angle γ of the at least one tire shoulder profile block elements may be greater than the twist angle γ of the at least one additional profile block elements. Further, the twist angle γ of the at least one tire shoulder profile block elements may be between approximately 35 and 60° and the twist angle γ of the at least one additional profile block elements may be between approximately 15 and 25°.

The present invention may also be directed to a snow tire including a plurality of profile block rows aligned in a circumferential direction composed of a plurality of profile block elements, a first tire shoulder adapted to be positioned toward an outside of the vehicle during an operational state of the tire, and a second tire shoulder adapted to be positioned toward an inside of the vehicle during an operational state of the tire. A circumferential channel may be positioned to form a handling region located between the first tire shoulder and the first circumferential channel and a winter region located between the second tire shoulder and the first circumferential channel. The profile block elements located within the handling region may have a greater stiffness than the profile block elements located within the winter region.

In accordance with another feature of the present invention, a pitch count in the winter region may be greater than a pitch count in the handling region.

In accordance with still another feature of the present invention, at least a second circumferential channel may be positioned in the winter region to separate adjacent profile block rows, at least a third circumferential channel may be positioned in the handling region to axially separate adjacent profile block rows, and an exposed groove cross-section of the second circumferential in the circumferential direction may be arranged to be at least one-half an exposed groove cross-section of the third circumferential channel in the circumferential direction.

In accordance with still another feature of the present invention, the plurality of profile block elements in the winter region may include peripheral edges delimiting each profile block element and a plurality of sipes located within each delimited profile block element. A distance between one of the peripheral edges adjacent to a longitudinal extent of one of the plurality of sipes and the one of the plurality of sipes may be greater than a distance between adjacent ones of the plurality of sipes.

In accordance with yet another feature of the present invention, one of the plurality of profile block rows within the winter region may be positioned adjacent to the profile block row including the second tire shoulder and a second circumferential channel may be arranged to axially separate the one of the plurality of profile block rows from the second tire shoulder profile block row. The profile block elements of the second tire shoulder profile block row and of the at least one additional profile block row may include a plurality of sipes extending in a longitudinal direction. The sipes may be arranged such that, along a depth in a radial direction, at least one sipe is continuously phase-shifted in the longitudinal direction, the phase-shift occurring along a line of inclination oriented at an angle α, with respect to the radial direction, and at least one adjacent sipe positioned adjacent to the at least one sipe is continuously phase-shifted in a direction opposite the longitudinal direction, the phase-shift occurring along a line of inclination oriented at an angle β, with respect to the radial direction. In this manner, the lines of inclination for adjacent sipes may be arranged to form a twist angle γ=α+β.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of preferred embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
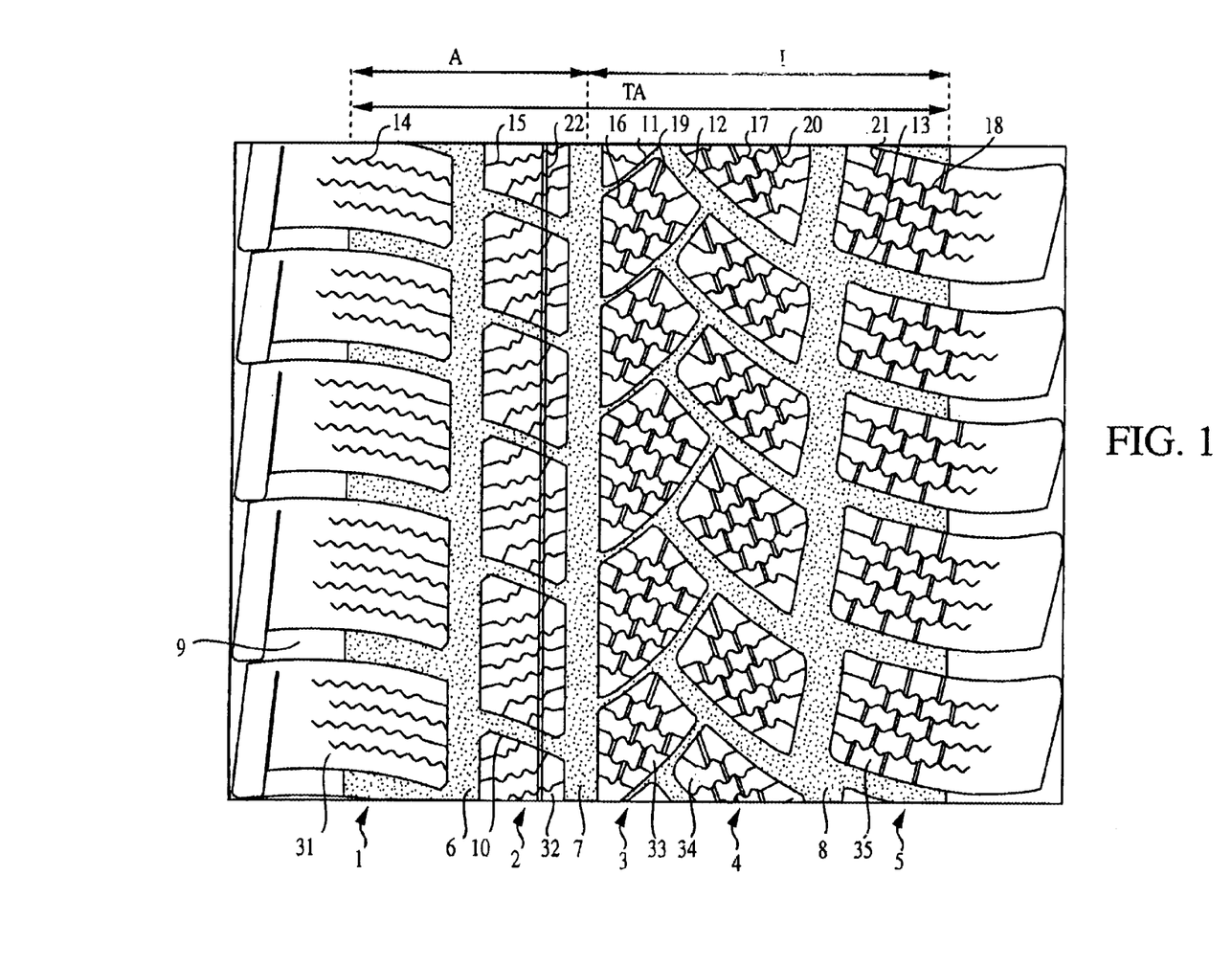
FIG. 1 illustrates a top view of a section of a tread profile.

FIG. 1 illustrates a circumferential section of a tread profile of a tubeless snow tire with five profile block rows 1, 2, 3, 4 and 5 arranged next to each other in an axial direction. The two outside profile block rows 1 and 5 are shoulder block rows. Adjacent profile block rows 1 and 2, or 2 and 3, or 4 and 5 may be axially separated from each other by a respective circumferential channel (groove) 6, 7, or 8. Profile block elements 31 of shoulder block row 1 may be successively arranged, i.e., one behind the other, in the circumferential direction and may be spaced from each other by cross channels 9. Profile block elements 35 of shoulder block row 5 may be successively arranged in the circumferential direction and may be spaced from each other by cross channels 13. Profile block elements 32 of profile block row 2 may be successively arranged in the circumferential direction and may be spaced apart from each other by cross channels 10. Profile block elements 33 of profile block row 3 may be successively arranged in the circumferential direction and may be spaced from each other by cross channels 11. Profile block elements 34 of profile block row 4 may be successively arranged in the circumferential direction and may be spaced from each other by cross channels 12. Cross channels 11 and 12 may also separate profile block rows 3 and 4 in the axial direction.

Profile block elements 31, 32, 33, 34 and 35 of respective profile block rows 1, 2, 3, 4 and 5 may each be provided with sipes, e.g., substantially sinusoidally constructed sipes (fine slots) 14, 15, 16, 17 and 18.

As shown, FIG. 1 depicts a width of a ground contact surface TA, which extends from shoulder profile block row 31 to shoulder profile block row 35. Ground contact surface TA may be axially divided into two functionally different regions, e.g., region A and region I. Region A extends from a first tire shoulder, which is to be directed toward an outside of the vehicle when in the operating state of a vehicle wheel, e.g., on a passenger car, to circumferential channel 7, and is designed especially for providing good handling characteristics. Region A may axially extend over between approximately 25 and 75% of ground contact surface TA, and, as depicted in the exemplary embodiment of FIG. 1, may extend over, e.g., 40% of ground contact surface TA. Region I extends from a second tire shoulder, which is to be directed toward an inside of the vehicle when in the operating state of a vehicle wheel, e.g., on a passenger car, to circumferential channel 7, and is designed especially for providing good winter traction characteristics.

Circumferential channels 6 and 7 may be formed to run or extend in a substantially straight line, i.e., in the circumferential direction, with constant width sufficient to ensure good water outflow. In this manner, the exposed groove cross-section in the circumferential direction corresponds to the width of circumferential channels 6 and 7. Circumferential channel 8 may also be formed to run or extend in the circumferential direction. However, while a distance between adjacent profile block elements 34 and 35, and thus the width of circumferential channel 8, may remain substantially constant and may substantially correspond to the width of circumferential channels 6 and 7, the exposed groove cross-section of circumferential channel 8 is less than the exposed groove cross-sections of circumferential channels 6 and 7. That is, profile block elements 34 and 35 are arranged such that their peripheral sides or edges positioned adjacent to circumferential channel 8 are oriented at an angle to the circumferential direction, and because these peripheral sides extend into circumferential channel 8, the exposed groove cross-section of circumferential channel 8 in the circumferential direction is reduced to be markedly smaller than the exposed groove cross section of the circumferential channels 6 and 7 in the circumferential direction. The exposed groove cross-section is a measure for the edges existing in a groove, and, thus, for ice traction and snow traction in the region of this groove. For example, the lower the exposed groove cross-section, the better the ice traction and snow traction. Adjacent profile block elements 33 and 34 of profile block rows 3 and 4 may be formed to axially extend into each other's profile block row. Thus, these profile block rows are arranged so that there is no exposed groove cross-section in the circumferential direction. Thus, the exposed groove cross-section in the circumferential direction is smaller in region I than in region A.

A pitch count of the profile block rows in region I may be higher than the pitch count in region A. For example, the pitch count in region I may be, e.g., approximately 63, and the pitch count in region A may be, e.g., approximately 59. In this way, more and shorter profile block elements may be distributed around the circumference in region I than in region A. Because more profile block elements are located within region I than in region A, region I is provided with correspondingly more edges than region A. The profile blocks in region A may be larger and stiffer than those located in region I. Cross channel 10 and cross channel 9 may be formed to run or extend diagonally with an angle of inclination greater than 0°, relative to the axial direction, from an opening of cross channel 10 into circumferential channel 7 axially outwardly toward the outside edge of region A. The angle of inclination may continually decrease in the axial direction from circumferential channel 7. In the region of circumferential channel 6, cross channels 10 and 9 may be offset relative to one another in the circumferential direction to such a degree that, to extend the courses of cross channels 10 and 9 along their courses of inclination, they would end obtusely at a peripheral edge or side wall of profile block element 31 or 32 of the other profile block row 1 or 2, i.e., cross channel 10 would terminate into a peripheral edge of profile block element 31 and cross channel 9 would terminate into a peripheral edge of profile block element 32.

Cross channel 11 may be formed to run or extend diagonally with an angle of inclination greater than 0°, relative to the axial direction, from the circumferential channel 7 axially outwardly toward the outside edge of region I. The angle of inclination may continually increase in the axial direction from circumferential channel 7.

Figure 4A:
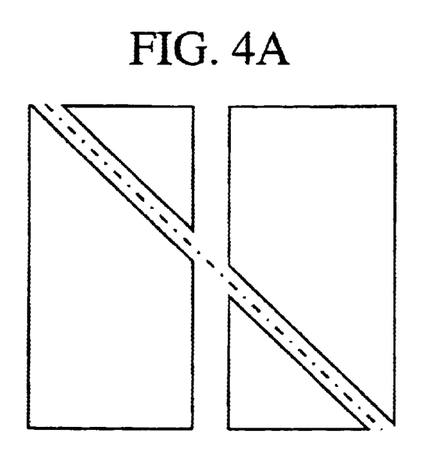
FIGS. 4a and 4b depict a cross channel and a cross channel offset.
Figure 4B:
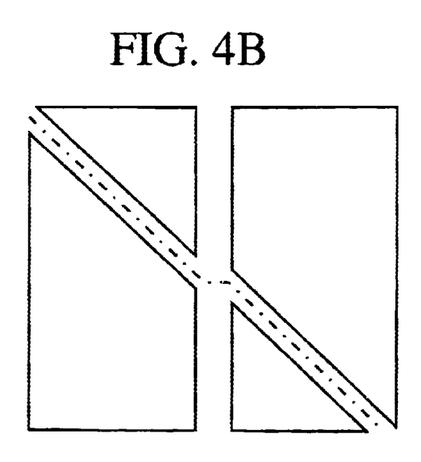

Cross channel 12 and cross channel 13 may be formed to run or extend diagonally with an angle of inclination less than 0°, relative to the axial direction, from the obtuse opening of cross channel 12 in circumferential channel 11 axially outwardly toward the outside of region I. The angle of inclination may continually decrease in the axial direction. In the region of circumferential channel 8, cross channels 12 and 13 may be offset relative to one another in the circumferential direction to such a degree that they both end at a same circumferential position in circumferential channel 8. In this regard, FIG. 4b illustrates the circumferential offset of channels 12 and 13 at circumferential channel 8, whereas FIG. 4a depicts an arrangement without a circumferential offset. Due to the offset arrangement of channels 12 and 13 through circumferential channel 8, resistance to water outflow is reduced as compared to a non-offset arrangement.

Profile block elements 31 or 35 of shoulder block rows 1 and 5 may be formed to include a plurality of sipes 14 or 18 that may be arranged to extend substantially parallel to each other and to respective cross channels 9 or 13. Sipes 14 or 18 may extend outwardly from respective adjacent circumferential channel 6 or 8 through the axial extent of ground contact surface TA.

Profile block elements 32, 33 and 34 of profile block rows 2, 3 and 4 may be formed to include a plurality of substantially parallel sipes 15, 16 and 17 that are positioned to extend over an entire respective profile block and to terminate in a circumferential or cross channel at each end.

Figure 5A:
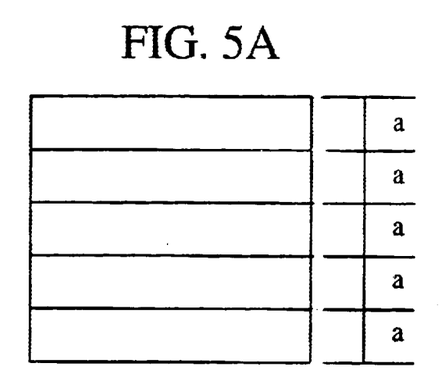
FIGS. 5a and 5b depict effective sipe length in a profile block.
Figure 5B:
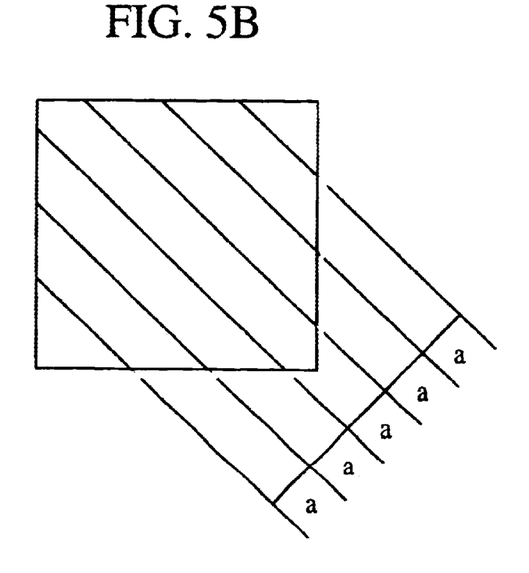

Sipes 15, 16, and 17 may be formed on a profile block element, which, for the purposes of illustration and explanation, is schematically depicted in FIGS. 5a and 5b as a square. The sipes may be formed at an angle of, e.g., between approximately 80 and 110° to the main diagonals, i.e., peripheral edge or side of the profile block element, as shown in FIG. 5b. Thus, it is apparent that, by orienting the sipes at an angle between 80 and 110° to the peripheral edge, the total sipe length for the profile block elements will be greater than the total sipe length for sipes oriented at an angle of 45° to the main diagonals, as shown in FIG. 5a.

Sipes 14, 15, 16, 17, and 18 may be arranged, in respective profile block elements 31, 32, 33, 34, and 35, to be substantially parallel so that a distance between individual adjacent sipes within a same profile block element is substantially the same and so that a distance between a peripheral edge of the respective profile block element and an adjacently arranged sipe located within the respective profile block element is between approximately 7 and 15% greater than a distance between the substantially parallelly arranged sipes arranged within the respective profile block element.

Figure 2A:
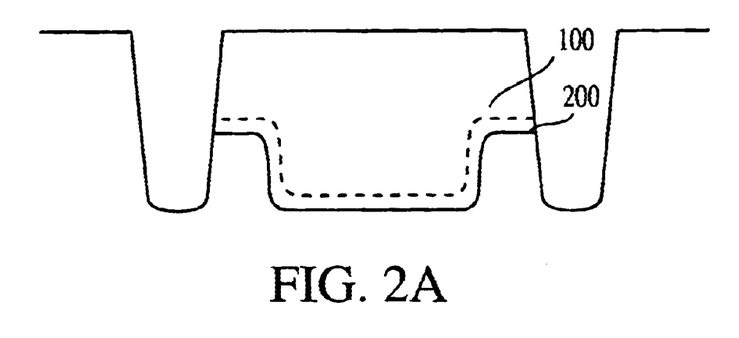
FIGS. 2a and 2b illustrate a depth profile for sipes arranged in a profile block element.
Figure 2B:
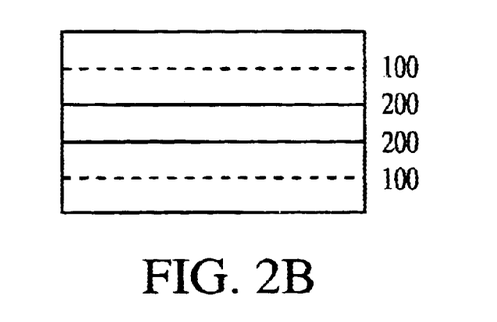

A depth profile of sipes 14, 15, 16, 17, and 18 may be formed as schematically depicted in FIGS. 2a and 2b, e.g., showing a profile block element with sipes 100 and 200. Sipes 100 and 200, as shown in FIG. 2a, may be formed with a substantially constant depth that is reduced in an edge region of the profile block by, e.g., approximately 35 to 65%. Sipes 100, which are arranged nearest to the profile block edge (FIG. 2b), are formed with a depth less than that of sipes 200 arranged within the interior of the profile block element.

The edge region of a profile block element may be, e.g., between approximately 3 and 6 mm thick.

Figure 3:
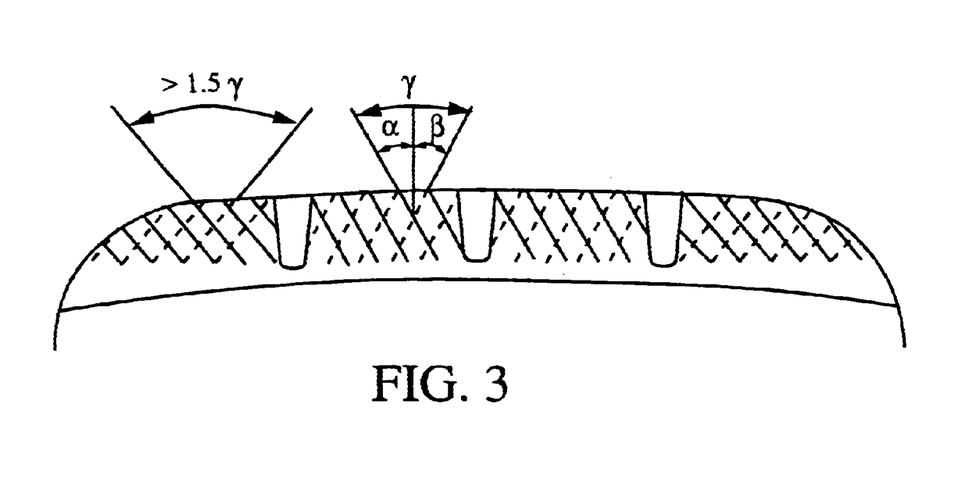
FIG. 3 depicts adjacent sipes to explain twist.

Sipes 14, 15, 16, 17, and 18 may be formed, with the exception of in the edge region of the respective profile block elements, with a sinusoidal progression in the block surface. Along their depth span, the progression in cutting planes, as described in the U.S. Pat. No. 6,026,875, entitled "Vehicle Tire with a Tread Exhibiting Sipes Substantially Running in the Axial Direction," the disclosure of which is expressly incorporated by reference herein in its entirety, the sipes may be sinusoidal parallel to the profile block surface but having increasing phase shifting with increasing depth. The phase shifting in the depth direction, i.e., radially inwardly from the outer circumferential surface of the profile block element, may occur along a straight line that subtends an angle greater than 0° with respect to the radial direction. As shown in FIG. 3, the phase shift in two adjacent sipes of a profile block element may occur along two different straight lines having angles of inclination oriented in opposite directions with respect to the radial direction. The angles of inclination of the two straight lines to the radial in a plane may be represented as $\alpha$ and $\beta$. Adjacent sipes of a profile block element may be formed, e.g., as described in above-noted U.S. Pat. No. 6,026,875, with alternatingly oriented phase shifts, i.e., a first sipe provided with a phase shift at an angle of inclination $\alpha$ and an adjacent sipe provided with a phase shift at an angle of inclination $\beta$. These alternating orientations provide a manner in which the profile block elements may be twisted. A measure of the twist may be determined by the aggregate angle $\gamma=\alpha+\beta$. Further, it may be preferable if $\gamma$ in profile block elements 35 of the tire shoulder profile block row 5 on the winter side of the tire is greater than $\gamma$ in profile block elements 31, 32, 33, and 34 of profile block rows 1, 2, 3, and 4. For example, $\gamma$ may be, e.g., approximately 40° in profile block element 35 and $\gamma$ may be, e.g., approximately 20° in profile block elements 31, 32, 33, and 34.

A width of sipes 14–18 may be, e.g., approximately 0.3 to 0.6 mm, and preferably approximately 0.4 mm.

A width of cross channels 9, 10, 12, and 13 may be, e.g., approximately 3 to 8 mm. A width of narrow cross channels 11 may be, e.g., approximately 1 to 2 mm, and preferably approximately 1.1 mm.

For venting sipes 16, 17, and 18, additional venting sipes 19, 20, and 21 may be arranged to run crosswise to the sipe direction in profile block elements 33, 34, and 35, and may have a width of, e.g., approximately 0.8 to 1.3 mm. Venting sipes 10–21 may be utilized to connect adjacent sipes to one another and the edge sipes to the adjacent channels. In this manner, air inclusions may be substantially avoided.

In profile block row 2, a straight channel 22 may be formed in the circumferential direction having a width of, e.g., approximately 1 to 2 mm and with a depth of, e.g., approximately 1.5 mm.

The snow tire is a tubeless vehicle air tire of known radial construction having belts with strength members of, e.g., steel or aramid and, if necessary, with additional known belt banding of helical wound or parallel applied banding material with known suitable strength members, e.g., nylon.

It is noted that the foregoing examples have been provided merely for the purpose of explanation and are in no way to be construed as limiting of the present invention. While the present invention has been described with reference to a preferred embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

REFERENCE SYMBOL LIST

1 profile block row
2 profile block row
3 profile block row
4 profile block row
5 profile block row
6 circumferential channel
7 circumferential channel
8 circumferential channel
9 cross channel
10 cross channel
11 cross channel
12 cross channel
13 cross channel
14 sipe
15 sipe
16 sipe
17 sipe
18 sipe
19 venting sipe
20 venting sipe
21 venting sipe
22 circumferential sipe
31 profile block element
32 profile block element
33 profile block element
34 profile block element
35 profile block element
100 sipe
200 sipe

What is claimed is:

1. Tread profile of a snow tire for a vehicle, comprising:
    a plurality of profile block rows aligned in a circumferential direction and distributed in an axial direction from a first tire shoulder adapted to be positioned toward an outside of the vehicle in an operational state of the tire on the vehicle to a second tire shoulder adapted to be positioned toward an inside of the vehicle in an operational state of the tire on the vehicle;
    a plurality of channels aligned in a circumferential direction and being arranged to axially separate the plurality of profile block rows from each other;
    the plurality of channels comprising a first circumferential channel, which is straight and has a constant width, positioned to divide the tread profile into two axial regions of functionally different structure, each axial region axially extending from one of the first and second tire shoulders to the first circumferential channel, and a second circumferential channel, which is straight with a constant width, positioned between the first tire shoulder and the first circumferential channel; and
    the plurality of profile block rows comprising a plurality of profile block elements, the plurality of profile block elements in the axial region extending from the first circumferential channel to the first tire shoulder having a higher lateral thrust stiffness than the plurality of profile block elements in the axial region extending from the first circumferential channel to the second tire shoulder.

2. The tread profile in accordance with claim 1,
    a structure factor along the circumferential direction and along a direction perpendicular to the circumferential direction in the plurality of profile block elements in the axial region extending from the first circumferential channel to the second tire shoulder is between approximately 10 and 50% higher than a structure factor along the circumferential direction and along the direction perpendicular to the circumferential direction in the plurality of profile block elements in the axial region extending from the first circumferential channel to the first tire shoulder,
    wherein the structural factor in the circumferential direction is a sum of the profile block edges and sipes projecting in the circumferential direction, and the structural factor in the direction perpendicular to the circumferential direction is the sum of the profile block edges and sipes projecting perpendicular to the circumferential direction.

3. The tread profile in accordance with claim 1, further comprising:
    a pitch count in the axial region extending from the first circumferential channel to the second tire shoulder is greater than a pitch count in the axial region extending from the first circumferential channel to the first tire shoulder.

4. The tread profile in accordance with claim 1, further comprising:
    at least one additional circumferential channel in the axial region extending from the first circumferential channel to the second tire shoulder and the second circumferential channel are positioned to separate adjacent profile block rows from each other;
    an exposed groove cross-section of the at least one additional circumferential channel in the axial region extending from the first circumferential channel to the second tire shoulder is smaller than an exposed groove cross-section of the at least one additional circumferential channel in the axial region extending from the first circumferential channel to the first tire shoulder pointing toward the vehicle outside in the operating state of the tire on the vehicle; and the exposed groove cross-section of the at least one additional circumferential channel in the axial region extending from the first circumferential channel to the second tire shoulder is at least half as large as an exposed groove cross-section of the first circumferential channel and the exposed groove cross-section of the second circumferential channel.

5. The tread profile in accordance with claim 1, wherein the plurality of profile block elements in the axial region extending from the first circumferential channel to the second tire shoulder comprises a plurality of sipes that are substantially parallelly arranged and that extend over the plurality of profile block elements; and a distance between a peripheral edge of a respective profile block element and an adjacently arranged sipe arranged within the respective profile block element is greater than a distance between the substantially parallelly arranged sipes arranged within the respective profile block element.

6. The tread profile in accordance with claim 5, wherein the distance between the peripheral edge of the respective profile block element and the adjacently arranged sipe arranged within the respective profile block element is between approximately 7 and 15% greater than the distance between the substantially parallelly arranged sipes arranged within the respective profile block element.

7. The tread profile in accordance with claim 1, the plurality of profile block elements in the axial region extending from the first circumferential channel to the second tire shoulder comprising a plurality of sipes that are substantially parallelly arranged and that extend over the plurality of profile block elements; and a depth profile of the sipes of a respective profile block element extending through the respective profile block element having a smaller depth at edges of the respective profile block element than at an interior of the respective profile block element.

8. The tread profile in accordance with claim 7, the depth of the sipes at the edges of the respective profile block element is between approximately 10 and 20% less than the depth of the sipe at the interior of the respective profile block element.

9. The tread profile in accordance with claim 1, at least one of the plurality of profile block rows comprising profile block elements successively arranged in the circumferential direction and separated cross channels oriented diagonally to the circumferential direction, the diagonally oriented cross channels forming diagonally running transverse edges for the profile block elements in the circumferential direction;

the profile block elements of the at least one profile block row comprising longitudinal edges that define the profile block elements in the axial direction;

the profile block elements of the at least one profile block row comprising a plurality of sipes arranged to be spaced from each other and to extend across the profile block element; and the sipes being oriented to extend at an angle between approximately 80 and 110° to a longer diagonal edge of the profile block element.

10. The tread profile in accordance with claim 1, the profile block rows located at the first and second tire shoulders and at least one profile block row located between the first and second tire shoulders comprising profile block elements successively arranged in the circumferential direction and separated cross channels oriented diagonally to the circumferential direction, the diagonally oriented cross channels forming diagonally running transverse edges for the profile block elements in the circumferential direction;

the profile block elements of the at least one profile block row comprising longitudinal edges that define the profile block elements in the axial direction;

the profile block elements of the at least one profile block row comprising a plurality of sipes arranged to be spaced from each other and to extend across the profile block element;

sipes arranged within the first and second tire shoulder profile block rows being oriented substantially parallel to the cross channel forming the diagonally running transverse edges of the profile block elements of the shoulder profile block rows; and the sipes arranged within the at least one profile block row located between the first and second tire shoulders being oriented to extend at an angle between approximately 80 and 110° to a longer diagonal edge of the profile block element.

11. The tread profile in accordance with claim 1, further comprising an additional profile block row located within the axial region extending from the first circumferential channel to the second tire shoulder and adjacent to the profile block row that includes the second tire shoulder;

a third circumferential channel arranged to separate the additional profile block row from the second tire shoulder profile block row;

the second tire shoulder profile block row and the additional profile block row comprising profile block elements successively arranged in the circumferential direction and separated cross channels oriented diagonally to the circumferential direction, the diagonally oriented cross channels forming diagonally running transverse edges for the profile block elements in the circumferential direction;

the diagonally oriented cross channels extending over both the second tire shoulder profile block row and the additional profile block rows and extending under substantially constant inclination axially inwardly from the second tire shoulder; and the cross channels being arranged to be offset from each other in the circumferential direction at a transition through the third circumferential channel such that an end of the cross channel of the second tire shoulder profile block row is oriented across the third circumferential channel at a same circumferential position as an end of the cross channel of the second tire shoulder block row.

12. The tread profile in accordance with claim 1, further comprising at least one additional profile block row located within the axial region extending from the first circumferential channel to the second tire shoulder and adjacent to the profile block row that includes the second tire shoulder;

a third circumferential channel arranged to separate the additional profile block row from the second tire shoulder profile block row;

the profile block elements of the second tire shoulder profile block row and of the at least one additional profile block row comprising a plurality of substantially transverse and substantially sinusoidal sipes separated from each other that extend in a longitudinal direction; and the substantially sinusoidal sipes being arranged such that, along a depth in a radial direction, at least one substantially sinusoidal sipe is continuously phase-shifted in the longitudinal direction, the phase-shift occurring along a line of inclination oriented at an angle $\alpha$, with respect to the radial direction, and at least one adjacent sipe positioned adjacent to the at least one substantially sinusoidal sipes is continuously phase-shifted in a direction opposite the longitudinal direction, the phase-shift occurring along a line of inclination oriented at an angle $\beta$, with respect to the radial direction, whereby, the lines of inclination for adjacent substantially sinusoidal sipes are arranged to form a twist angle $\gamma=\alpha+\beta$, which is a measure for twist of the substantially sinusoidal sipes.

13. The tread profile in accordance with claim 12, wherein the twist angle $\gamma$ of the second tire shoulder profile block elements is greater than the twist angle $\gamma$ of the at least one additional profile block elements.

14. The tread profile in accordance with claim 12, wherein the twist angle $\gamma$ of the second tire shoulder profile block elements is between approximately 35 and 60° and the twist angle $\gamma$ of the at least one additional profile block elements is between approximately 15 and 25°.

15. A vehicle including at least two vehicle wheels which are rotatably mounted outside of a longitudinal vehicle axis with a snow tire mounted on each of the at least two vehicle wheels, said snow tire comprising:

a plurality of profile block rows aligned in a circumferential direction and distributed in an axial direction from a first tire shoulder positioned toward an outside of the vehicle to a second tire shoulder positioned toward an inside of the vehicle;

a plurality of channels aligned in a circumferential direction and being arranged to axially separate the plurality of profile block rows from each other;

the plurality of channels comprising a first circumferential channel, which is straight and has a constant width, positioned to divide the tread profile into two axial regions of functionally different structure, each axial region axially extending from one of the first and second tire shoulders to the first circumferential channel, and a second circumferential channel, which is straight and has a constant width, positioned between the first circumferential channel and the first tire shoulder; and the plurality of profile block rows comprising a plurality of profile block elements, the plurality of profile block elements in the axial region extending from the first circumferential channel to the first tire shoulder having a higher lateral thrust stiffness than the plurality of profile block elements in the axial region extending from the first circumferential channel to the second tire shoulder.

16. A tread profile of tire comprising:

profile block rows comprising two shoulder profile block rows and at least one additional profile block row arranged between the two shoulder profile block rows;

a first circumferential channel, which is straight and has a constant width, positioned to divide the tread profile into two axial regions of functionally different structure, each axial region axially extending from the tire shoulder profile block rows to the first circumferential channel and a second circumferential channel, which is straight and has a constant width, positioned between the first circumferential channel and one of the tire shoulders profile block rows;

the profile block rows including profile block elements, and the profile block elements of at least one of the two shoulder block rows and of the at least one additional profile block row comprising a plurality of substantially transverse and substantially sinusoidal sipes separated from each other that extend in a longitudinal direction;

the substantially sinusoidal sipes being arranged such that, along a depth in a radial direction, at least one substantially sinusoidal sipe is continuously phase-shifted in the longitudinal direction, the phase-shift occurring along a line of inclination oriented at an angle $\alpha$, with respect to the radial direction, and at least one adjacent sipe positioned adjacent to the at least one substantially sinusoidal sipes is continuously phase-shifted in a direction opposite the longitudinal direction, the phase-shift occurring along a line of inclination oriented at an angle $\beta$, with respect to the radial direction, whereby, the lines of inclination for adjacent substantially sinusoidal sipes are arranged to form a twist angle $\gamma+\alpha+\beta$, which is a measure for twist of the substantially sinusoidal sipes; and the twist angle $\gamma$ of the at least one tire shoulder profile block elements is greater than the twist angle $\gamma$ of the at least one additional profile block elements.

17. The tread profile in accordance with claim 15, wherein the twist angle $\gamma$ of the at least one tire shoulder profile block elements is between approximately 35 and 60° and the twist angle $\gamma$ of the at least one additional profile block elements is between approximately 15 and 25°.

18. A snow tire comprising:

a plurality of profile block rows aligned in a circumferential direction composed of a plurality of profile block elements;

a first tire shoulder adapted to be positioned toward an outside of the vehicle during an operational state of the tire;

a second tire shoulder adapted to be positioned toward an inside of the vehicle during an operational state of the tire;

a first circumferential channel which is straight with a constant width positioned to form a handling region located between the first tire shoulder and the first circumferential channel and a winter region located between the second tire shoulder and the first circumferential channel;

a second circumferential channel which is straight with a constant width positioned within the handling region; and the profile block elements located within the handling region having a greater stiffness than the profile block elements located within the winter region.

19. The snow tire in accordance with claim 18, further comprising:

a pitch count in the winter region that is greater than a pitch count in the handling region.

20. The tread profile in accordance with claim 18, further comprising:

at least a third circumferential channel positioned in the winter region to separate adjacent profile block rows;

the second circumferential channel located in the handling region being positioned to axially separate adjacent profile block rows; and an exposed groove cross-section of the third circumferential in the circumferential direction is arranged to be at least one-half an exposed groove cross-section of the second circumferential channel in the circumferential direction.

21. The tread profile in accordance with claim 18, the plurality of profile block elements in the winter region comprising peripheral edges delimiting each profile block element and a plurality of sipes located within each delimited profile block element; and a distance between one of the peripheral edges adjacent to a longitudinal extent of one of the plurality of sipes and the one of the plurality of sipes being greater than a distance between adjacent ones of the plurality of sipes.

22. The tread profile in accordance with claim 18, one of the plurality of profile block rows within the winter region being positioned adjacent to the profile block row including the second tire shoulder;

a third circumferential channel arranged to axially separate the one of the plurality of profile block rows from the second tire shoulder profile block row;

the profile block elements of the second tire shoulder profile block row and of the at least one additional profile block row comprising a plurality of sipes extending in a longitudinal direction; and the sipes being arranged such that, along a depth in a radial direction, at least one sipe is continuously phase-shifted in the longitudinal direction, the phase-shift occurring along a line of inclination oriented at an angle $\alpha$, with respect to the radial direction, and at least one adjacent sipe positioned adjacent to the at least one sipe is continuously phase-shifted in a direction opposite the longitudinal direction, the phase-shift occurring along a line of inclination oriented at an angle $\beta$, with respect to the radial direction, whereby, the lines of inclination for adjacent sipes are arranged to form a twist angle $\gamma=\alpha+\beta$.

* * * * *